(12) United States Patent
Kong et al.

(10) Patent No.: US 9,081,508 B2
(45) Date of Patent: Jul. 14, 2015

(54) FILE PROCESSING METHOD AND STORAGE DEVICE

(71) Applicant: Huawei Technologies Co., Ltd., Shenzhen (CN)

(72) Inventors: Han Kong, Chengdu (CN); Jing Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/567,588

(22) Filed: Dec. 11, 2014

(65) Prior Publication Data
US 2015/0095573 A1  Apr. 2, 2015

Related U.S. Application Data

(63) Continuation of application No. PCT/CN2013/081172, filed on Aug. 9, 2013.

(51) Int. Cl.
*G06F 12/00* (2006.01)
*G06F 3/06* (2006.01)

(52) U.S. Cl.
CPC ............ *G06F 3/0625* (2013.01); *G06F 3/0643* (2013.01); *G06F 3/0689* (2013.01)

(58) Field of Classification Search
CPC ... G06F 3/0625; G06F 3/0628; G06F 3/0629; G06F 3/0631; G06F 3/0632; G06F 3/0638; G06F 3/064; G06F 3/0643; G06F 3/0689

USPC .......................................................... 711/114
See application file for complete search history.

(56) References Cited

U.S. PATENT DOCUMENTS

| | | | |
|---|---|---|---|
| 6,311,251 B1 * | 10/2001 | Merritt et al. | 711/114 |
| 2006/0236029 A1 * | 10/2006 | Corrado et al. | 711/114 |
| 2010/0299547 A1 | 11/2010 | Saika | |
| 2011/0238912 A1 * | 9/2011 | Shuster | 711/114 |

FOREIGN PATENT DOCUMENTS

| | | |
|---|---|---|
| CN | 101055509 A | 10/2007 |
| CN | 101976174 A | 2/2011 |
| CN | 101976178 A | 2/2011 |

* cited by examiner

*Primary Examiner* — Aimee Li
*Assistant Examiner* — Prasith Thammavong
(74) *Attorney, Agent, or Firm* — Huawei Technologies Co., Ltd.

(57) ABSTRACT

A file processing method and a storage device are disclosed. In the method, a storage device receives T files that are to be stored in the RAID, and determines a sequence number of a check block in a stripe of the RAID. The storage device repeatedly obtains a data block of the $K^{th}$ file in the T files as the $K^{th}$ data block in the stripe, where a value of K progressively increases from 1 to T, and the value of K is not equal to the sequence number of the check block in the stripe. After computing the check block according to data blocks, the storage device writes, into the T disks, the data blocks and the obtained check block in the stripe. By using the foregoing method, one file can be written into one disk of the RAID while ensuring security of file storage.

12 Claims, 9 Drawing Sheets

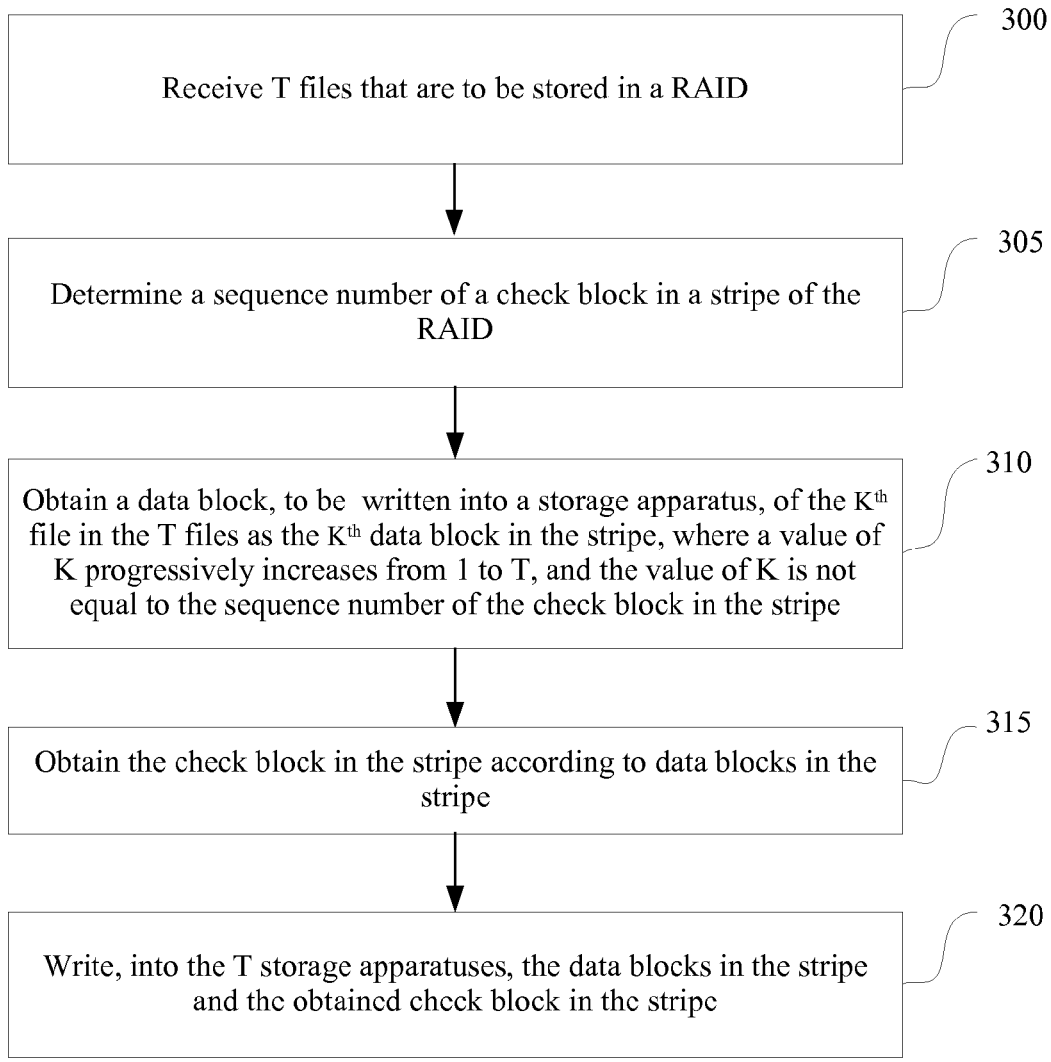

FILE PROCESSING METHOD AND STORAGE DEVICE

CROSS-REFERENCE TO RELATED APPLICATIONS

This application is a continuation of International Application No. PCT/CN2013/081172, filed on Aug. 9, 2013, which is hereby incorporated by reference in its entirety.

TECHNICAL FIELD

The present invention relates to the field of communications technologies, and in particular, to a file processing method and a storage device.

BACKGROUND

A redundant array of independent disks (RAID), also referred to as a redundant array of inexpensive disks (RAID), is referred to as a disk array for short. A principle of the redundant array of independent disks is to combine a plurality of relatively inexpensive hard disks to form a hard disk array group, so as to provide performance that reaches or even exceeds performance of a pricy hard disk with a huge capacity, and improve data security in combination with a design of distributed data arrangement. According to a different version that is selected, compared with a single hard disk, the RAID can increase a storage capacity, and can also improve data integration and a data error tolerance capability. In addition, for a computer, a disk array looks like an independent hard disk or a logical storage unit.

In an archiving scenario, a large number of files need to be archived. Therefore, in the prior art, a RAID is generally used to store archived files. In addition, to improve data security, a RAID with a check function, for example, in a form of a RAID 3, a RAID 4, a RAID 5, or a RAID 6, is generally used to store archived files. In the prior art, to improve a data access speed, a file is generally divided into several data blocks. A stripe, which includes a plurality of data blocks belonging to one file and check data, is written into a plurality of disks that form the RAID. Because archived files are less frequently accessed, in order to achieve a purpose of energy-saving, disks in a storage system are generally in a sleeping or power-off state after files are archived. When a certain archived file needs to be accessed, the plurality of disks in which data blocks of the file are stored need to be waken up or powered on, so as to read the file.

SUMMARY

Embodiments of the present invention provide a file processing method and a storage device, which can store one file in one storage apparatus of a RAID while ensuring security of file storage, and can achieve an effect of energy saving.

According to a first aspect, an embodiment of the present invention provides a file processing method performed by a storage device for storing a file in a redundant array of independent disks (RAID), including:

receiving T files that are to be stored in the RAID, where a value of the T is no less than 3, and the value of the T is equal to the number of disks that form the RAID;

determining a sequence number of a check block in a stripe of the RAID;

repeatedly obtaining a data block, to be written into a disk, of the $K^{th}$ file in the T files as the $K^{th}$ data block in the stripe, where a value of K progressively increases from 1 to T, and the value of K is not equal to the sequence number of the check block in the stripe;

computing the check block in the stripe according to data blocks in the stripe; and writing, into the T disks, the data blocks in the stripe and the obtained check block in the stripe, wherein each block is written into one disk.

In a first possible implementation manner of the first aspect, the file processing method further includes:

when the $K^{th}$ file has no data block to be written into the RAID, determining whether other files except the T files are received;

if the other files are received, selecting a file from the received other files; and using a data block, to be written into a disk, in the selected file as the $K^{th}$ data block in the stripe.

With reference to the first aspect, in a second possible implementation manner of the first aspect, the method further includes:

when the $K^{th}$ file has no data block to be written into a disk, if other files except the T files are not received, filling the $K^{th}$ data block in the stripe with 0s.

With reference to the first aspect or any one of the first to the second possible implementation manners of the first aspect, in a third possible implementation manner, the method further includes:

receiving an access request of a host, where the access request is used to read a file stored in the RAID, and the access request carries a logical address of the file that needs to be accessed;

querying, according to the logical address, a physical address in which a data block of the file is stored;

determining, according to the physical address, one disk in which the file is stored; and returning, to the host, the data block of the file stored in the disk.

According to a second aspect, an embodiment of the present invention provides a method performed by a storage device for storing a file in a redundant array of independent disks (RAID), where the RAID includes D data disks and P independent check disks, a value of the D is no less than 2, and a value of the P is no less than 1; and the method includes:

receiving D files that are to be stored in the RAID;

repeatedly obtaining a data block, to be written into a data disk, of the $K^{th}$ file in the D files as a data block that is in a stripe of the RAID and is to be stored in the $K^{th}$ data disk, where a value of K progressively increases from 1 to D;

computing P check blocks in the stripe according to the obtained D data blocks; and writing the D data blocks into the D data disks, and writing the P check blocks into the P independent check disks, wherein each block is written into one disk.

In a first possible implementation manner of the second aspect, the method further includes:

when the $K^{th}$ file has no data block to be written into a data disk, determining whether other files except the D files are received;

if the other files are received, selecting a file from the received other files; and using a data block, to be written into a disk, in the selected file as a data block that is in the stripe and is to be stored in the $K^{th}$ data disk.

With reference to the second aspect, in a second possible implementation manner of the second aspect, the method further includes:

when the $K^{th}$ file has no data block to be written into a data disk, if other files except the D files are not received, filling the data block that is in the stripe and is to be stored in the $K^{th}$ data disk with 0s.

With reference to the second aspect or any one of the first to the second possible implementation manners of the second aspect, in a third possible implementation manner, the method further includes:

receiving an access request of a host, where the access request is used to read a file stored in the RAID, and the access request carries a logical address of the file that needs to be accessed;

querying, according to the logical address, a physical address in which a data block of the file is stored;

determining, according to the physical address, one disk in which the file is stored; and returning, to the host, the data block of the file stored in the disk.

According to a third aspect, an embodiment of the present invention provides a storage device, including:

a redundant array of independent disks RAID, configured to store a file, and the RAID includes T disks, where a value of the T is no less than 3; a communication interface, configured to communicate with a host and the RAID; and a processor, configured to receive T files that are to be stored in the RAID;

determine a sequence number of a check block in a stripe of the RAID;

repeatedly obtain a data block, to be written into a disk, of the $K^{th}$ file in the T files as the $K^{th}$ data block in the stripe, where a value of K progressively increases from 1 to T, and the value of K is not equal to the sequence number of the check block in the stripe;

compute the check block in the stripe according to data blocks in the stripe; and write, into the T disks, the data blocks in the stripe and the obtained check block in the stripe, wherein each block is written into one disk.

In a first possible implementation manner of the third aspect, the processor is further configured to:

when the $K^{th}$ file has no data block to be written into a disk, determine whether other files except the T files are received;

if the other files are received, select a file from the received other files; and use a data block, to be written into a disk, in the selected file as the $K^{th}$ data block in the stripe.

With reference to the third aspect, in a second possible implementation manner of the third aspect, the processor is further configured to:

when the $K^{th}$ file has no data block to be written into a disk, if other files except the T files are not received, fill the $K^{th}$ data block in the stripe with 0s.

With reference to the third aspect or any one of the first to the second possible implementation manners of the third aspect, in a third possible implementation manner, the processor is further configured to:

receive an access request of a host, where the access request is used to read a file stored in the RAID, and the access request carries a logical address of the file that needs to be accessed;

query, according to the logical address, a physical address in which a data block of the file is stored;

determine, according to the physical address, one disk in which the file is stored; and return, to the host, the data block of the file stored in the disk.

According to a fourth aspect, an embodiment of the present invention provides a storage device, including:

a redundant array of independent disks RAID is configured to store a file, where the RAID comprises D data disks and P independent check disks, a value of the D is no less than 2, and a value of the P is no less than 1;

a communication interface, configured to communicate with a host and the RAID; and a processor, configured to receive D files that are to be stored in the RAID;

repeatedly obtain a data block, to be written into a data disk, of the $K^{th}$ file in the D files as a data block that is in a stripe of the RAID and is to be stored in the $K^{th}$ data disk, where a value of K progressively increases from 1 to D;

compute P check blocks in the stripe according to the obtained D data blocks; and write the D data blocks into the D data disks, and write the P check blocks into the P independent check disks, wherein each block is written into one disk.

In a first possible implementation manner of the fourth aspect, the processor is further configured to:

when the $K^{th}$ file has no data block to be written into a data disk, determine whether other files except the D files are received;

if the other files are received, select a file from the received other files; and use a data block, to be written into a disk, in the selected file as a data block that is in the stripe and is to be stored in the $K^{th}$ data disk.

With reference to the fourth aspect, in a second possible implementation manner of the fourth aspect, the processor is further configured to:

when the $K^{th}$ file has no data block to be written into a data disk, if other files except the D files are not received, fill the data block that is in the stripe and is to be stored in the $K^{th}$ data disk with 0s.

With reference to the fourth aspect or any one of the first to the second possible implementation manners of the fourth aspect, in a third possible implementation manner, the processor is further configured to:

receive an access request of a host, where the access request is used to read a file stored in the RAID, and the access request carries a logical address of the file that needs to be accessed;

query, according to the logical address, a physical address in which a data block of the file is stored;

determine, according to the physical address, one disk in which the file is stored; and return, to the host, the data block of the file stored in the disk.

According to a fifth aspect, an embodiment of the present invention provides a computer program product, including a computer readable storage medium that stores program code, where an instruction included in the program code is used to execute the method according to the first aspect and any one of possible implementation manners of the first aspect.

According to a sixth aspect, an embodiment of the present invention provides a computer program product, including a computer readable storage medium that stores program code, where an instruction included in the program code is used to execute the method according to the second aspect and any one of possible implementation manners of the second aspect.

According to the file processing method provided in the embodiments of the present invention, a storage device determines a sequence number of a check block in a stripe of a RAID. A data block, to be written into a storage apparatus, of the $K^{th}$ file in received T files is obtained to be the $K^{th}$ data block in the stripe, where a value of K is not equal to the sequence number of the check block in the stripe. After obtaining data blocks from the files, the storage device obtains, by computing, the check block in the stripe according to the obtained data blocks in the stripe, and writes the data blocks and the check block in the stripe into disks that form the RAID. Before the storage device write the files into disks, data blocks of one file are correspond to same position in stripes, thus the data blocks of the one file are correspond to one disk in the RAID. Therefore, the storage device can write all data blocks of the one file into the one disk. In an application scenario of archiving, when a file, which is stored in the RAID by using the method of the embodiments of the present invention needs to be accessed, not all disks in the RAID need to be waken up or powered on, but only one disk in which the file is stored needs to be operated, so as to achieve a significant effect of energy saving.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention.

FIG. 3 is a flowchart of a file processing method according to an embodiment of the present invention;

FIG. 4A is a schematic diagram of positions according to an embodiment of the present invention;

DESCRIPTION OF EMBODIMENTS

To make a person skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention.

Figure 1:
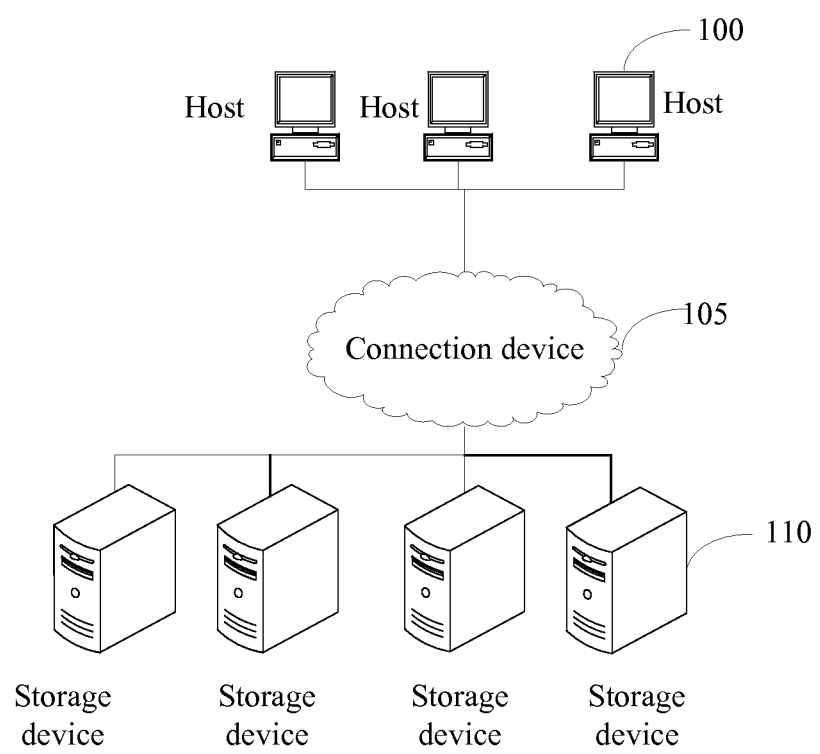
FIG. 1 is a diagram of an application scenario of a file processing method according to an embodiment of the present invention.

As shown in FIG. 1, FIG. 1 is a diagram of an application scenario according to an embodiment of the present invention. In the application scenario shown in FIG. 1, a storage system includes a host 100, a connection device 105, and a storage device 110.

The host 100 may include any computing device known in the prior art, such as a server, a desktop computer, or an application server. An operating system and other application programs are installed on the host 100, and there may be multiple hosts 100.

The connection device 105 may include any interface between a storage device and a host that is known in the prior art, for example, a fiber switch or another existing switch.

The storage device 110 may include a storage device known in the prior art, such as a storage array, a Just a Bunch Of Disks (JBOD), or one or more interconnected disk drives of a direct access storage device (DASD), where the direct access storage device may include a tape library or a tape storage device with one or more storage units.

Figure 2:
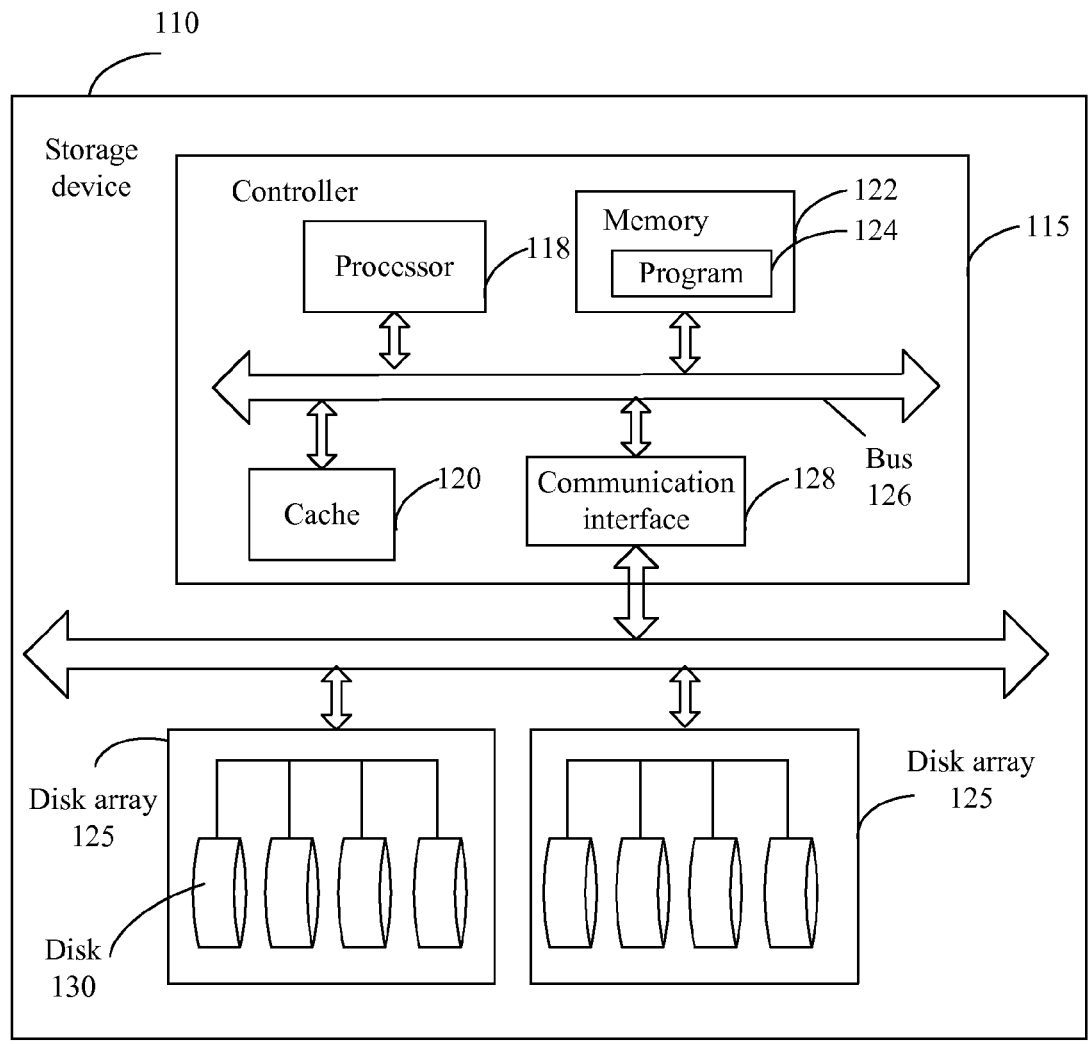
FIG. 2 is a schematic structural diagram of a storage device according to an embodiment of the present invention.

FIG. 2 is a schematic structural diagram of a storage device 110 according to an embodiment of the present invention, and the storage device shown in FIG. 2 is a storage array. As shown in FIG. 2, the storage device 110 may include a controller 115 and a disk array 125, where the disk array herein refers to a redundant array of independent disks (RAID). There may be multiple disk arrays 125, and the disk array 125 is formed by multiple disks 130. Communication between the disk array 125 and the controller 115 may be performed by using a communications protocol, such as the small computer system interface (SCSI) protocol, which is not limited herein.

The controller 115 is a "brain" of the storage device 110. The controller 115 mainly includes a processor 118, a cache 120, a memory 122, a communication bus (bus for short) 126, and a communication interface 128. The processor 118, the cache 120, the memory 122, and the communication interface 128 communicate with each other by using the communication bus 126.

The communication interface 128 is configured to communicate with the host 100 and the disk array 125.

The memory 122 is configured to store a program 124. The memory 122 may include a high-speed RAM memory, or may include a non-volatile memory (non-volatile memory), for example, at least one disk memory. It can be understood that the memory 122 may be any non-transitory machine-readable medium which is capable of storing program code, such as a random-access memory (RAM), a magnetic disk, a hard disk, an optical disc, a solid state disk (SSD), or a non-volatile memory.

The program 124 may include program code, where the program code includes a computer operation instruction.

The cache 120 is configured to buffer data received from the host 100 and buffer data read from the disk array 125, so as to improve performance and reliability of the array. The cache 120 may be any non-transitory machine-readable medium which is capable of storing data, such as a RAM, a ROM, a flash memory, or a solid state disk (SSD), which is not limited herein.

The processor 118 may be a central processing unit CPU, or an application specific integrated circuit ASIC, or be configured as one or more integrated circuits that implement the embodiment of the present invention. An operating system and other software programs are installed in the processor 118. Different software programs may be considered as a processing module with different functions, for example, processing an input/output (I/O) request for a disk 130, performing other processing on data in the disk, or modifying metadata stored in the storage device. Therefore, the controller 115 can implement an IO operation and a RAID management function, and can also provide various data management functions, such as snapshotting, mirroring, and copying. In the embodiment of the present invention, the processor 118 is configured to execute the program 124, and may specifically perform related steps of the following method embodiments.

The disk array 125 is configured to store data. In the embodiment of the present invention, an organization form of the disk array 125 is a RAID manner with a check function, for example, a RAID 3, RAID 4, RAID 5, or RAID 6, which is not limited herein.

With reference to FIG. 1, any storage device 110 may receive, through a connection device 105, multiple files sent by one or more hosts 100, divide the received multiple files into multiple data blocks, and store the data blocks in multiple disks 130 that form the disk array 125. Any storage device 110 may also receive a file read request sent by any host 100, and return a data block of the file stored in the disk 130 to the host 100 according to the file read request.

It should be noted that the disk 130 is merely an example of storage apparatuses that form the disk array 125, and in an actual application, there may be an implementation manner that a disk array is formed between cabinets including multiple disks. Therefore, the storage apparatus in the embodiment of the present invention may include any apparatus such as a magnetic disk, a solid state drives (SSD), a server, or a cabinet formed of multiple magnetic disks, which is not limited herein.

FIG. 3 is a flowchart of a file processing method according to an embodiment of the present invention. The method may be performed by the controller 115 of the storage device 110 shown in FIG. 2, and the method may be applied to a file archiving scenario. The method is mainly applied to a RAID organization form with a distributed check function, where the RAID organization form with a distributed check function includes but is not limited to a RAID 5 and a RAID 6. As shown in FIG. 3, the method includes:

In step 300, the storage device 110 receives T files that are to be stored in a RAID, where a value of the T is a natural number no less than 3, and the value of the T is equal to the number of storage apparatuses that form the RAID.

In the embodiment of the present invention, the controller 115 of the storage device 110 may receive a file storage request sent by one or more hosts 100. The file storage request is used to request to store a file in the RAID, and the file storage request may include one or more files to be stored.

With reference to FIG. 2, the storage device 110 may include multiple RAIDs, and each RAID should include no less than 3 disks. It should be understood that multiple RAIDs included in one storage device 110 may have same organization form. For example, all RAIDs included in the storage device 110 are in an organization form of the RAID 5. Certainly, the organization forms of the multiple RAIDs included in one storage device 110 may also be different. For example, if the storage device 110 includes two RAIDs, one RAID may be the RAID 3, and the other RAID may be the RAID 5, which is not limited herein. In the embodiment of the present invention, one RAID in the storage device 110 is used as an example for description.

It can be understood that the storage device 110 may process T files when receive T files. The storage device 110 may also buffer received multiple files in the cache 120, and then randomly select T files from the received multiple files for processing when storage time reaches. A value of T is equal to the number of disks in the RAID. For example, if the RAID includes 4 disks, the storage device 110 may process 4 files at the same time.

The storage time is a preset time for writing files into disks that form the RAID. For example, it may be specified that storage is performed once an hour, and then the storage time is 1 hour. The storage time may be determined according to an actual situation such as a volume of data that needs to be written into disks. Storage may be performed once a day, or storage may be performed every 10 minutes, which is not limited herein.

In step 305, the storage device 110 determines a sequence number of a check block in a stripe of the RAID. A stripe described in the embodiment of the present invention indicates a set of data blocks that are concurrently written into each of storage apparatuses that form the RAID, where a size of each data block in the stripe is the same, and data blocks of a stripe are located in each storage apparatus with same offset. A data block in the stripe is also referred to as a strip, and the strip is a continuous address block in an extent. In a disk array, the controller generally uses a strip to map a block address of a virtual disk to a block address of a member disk. A strip is also referred to as a stripe element.

In a specific operation, the storage device 110 may determine a sequence number of a check block in a stripe according to an organization form of the RAID. The sequence number herein indicates a position number of a check block in the stripe. In the embodiment of the present invention, a position number in a stripe starts from 1 and progressively increases by 1 successively. For example, as shown in FIG. 4A, a stripe 1 includes a check block 1 of a data block 1, a data block 2 and a data block 3. A sequence number of the data block 1 is 1, a sequence number of the data block 2 is 2, and a sequence number of the data block 3 is 3. The check block 1 is located in the $4^{th}$ position of the stripe 1, so that a sequence number of the check block 1 is 4. A stripe 2 includes a data block 4, a data block 5, a check block 2, and a data block 6, where the check block 2 is located in the $3^{rd}$ position of the stripe 2, so that a sequence number of the check block 2 is 3. It can be understood that a sequence number in a stripe corresponds to a sequence number of a member disk in the RAID. For example, if a sequence number of a check block in a stripe is 4, the check bock may be written into the fourth member disk in the RAID.

In a RAID with a distributed check function, how a specific check block is distributed in a strip may be determined according to an organization form of the first RAID and a distribution manner of the check block. For example, a distribution manner of a check block on a disk in the RAID 5 may be left synchronous (backward parity or Left Synchronous), left asynchronous (backward dynamic or Left Asynchronous), right synchronous (forward parity or Right Synchronous), or right asynchronous (forward dynamic or Right Asynchronous). "Left" or "right" indicates how check information is distributed, and "synchronous" or "asynchronous" indicates how data is distributed. In an algorithm of "left", starting from the last disk, a check block is moved one disk position in each stripe in a direction towards the first disk (to be distributed circularly and repeatedly if necessary). In an algorithm of "right", starting from the first disk, a check block is moved one disk position in each stripe in a direction towards the last disk (to be distributed circularly and repeatedly if necessary). The RAID 6 is added with another group of check blocks on a basis of the RAID 5.

In step 310, the storage device 110 obtains a data block, to be written into a storage apparatus, of the $K^{th}$ file in the T files as the $K^{th}$ data block in the stripe, where a value of K progressively increases from 1 to T, and the value of K is not equal to the sequence number of the check block in the stripe.

For example, there are 4 disks in the RAID. If in step 305, the storage device 110 determines that a sequence number of the check block in the current stripe is a sequence number of 4 in the stripe 1 shown in FIG. 4A, then in step 310, when the storage device 110 processes received 4 files F1, F2, F3, and F4, the value of K starts from 1 and progressively increases by 1 successively. It can be understood that the value of K cannot be greater than T. In addition, a position needs to be reserved for the check block in the stripe. Therefore, in the embodiment of the present invention, the value of K is not equal to the sequence number of the check block in the stripe. In other words, the storage device 110 may, starting from the $1^{st}$ file, successively obtain a data block in a corresponding position of the stripe. However, the storage device 110 does not obtain a data block from a file corresponding to a value of the sequence number of the check block in the stripe. For example, a data block of the $1^{st}$ file F1 is obtained to be the $1^{st}$ data block in the stripe 1 (the data block 1 in the stripe 1 shown in FIG. 4A), a data block of the $2^{nd}$ file F2 is obtained to be the $2^{nd}$ data block in the stripe 1 (the data block 2 in the stripe 1 shown in FIG. 4A), and a data block of the $3^{rd}$ file F3 is obtained to be the $3^{rd}$ data block in the stripe 1 (the data block 3 in the stripe 1 shown in FIG. 4A). Because the value of K is not equal to the sequence number of the check block in the stripe, in step 310, the storage device 110 does not obtain a data block of the $4^{th}$ file F4.

It can be understood that, if in step 305, the storage device 110 determines that the sequence number of the check block in the current stripe is a sequence number of 3 in the stripe 2 shown in FIG. 4A, then, in step 310, a data block of the $1^{st}$ file F1 may be obtained to be the 1st data block in the stripe 2 (the data block 4 in the stripe 2 shown in FIG. 4A), a data block of the $2^{nd}$ file F2 may be obtained to be the $2^{nd}$ data block in the stripe 2 (the data block 5 in the stripe 2 shown in FIG. 4A), and a data block of the $4^{th}$ file F4 may be obtained to be the $4^{th}$ data block in the stripe 2 (the data block 6 in the stripe 2 shown in FIG. 4A). In this case, the sequence number of the check block in the stripe 2 is 3, and therefore, the storage device 110 does not obtain a data block of the $3^{rd}$ file F3.

It should be noted that the number of check blocks in a stripe is not limited in the embodiment of the present invention. It can be understood that if one stripe of the RAID includes one check block, and a sequence number of the check block in the stripe is 3, the storage device 110 does not obtain a data block of the $3^{rd}$ file. If one stripe of the RAID includes 2 check blocks, and sequence numbers of the two check blocks in the stripe are 3 and 4, respectively, the storage device 110 does not obtain a data block from the $3^{rd}$ file and the $4^{th}$ file.

The data block described in the embodiment of the present invention indicates a data unit formed by multiple pieces of data. The check block described in the embodiment of the present invention indicates a data unit formed by check data. Data blocks obtained from different files are formed into a stripe of the RAID. Therefore, it can be understood that the storage device 110 may obtain data blocks from files according to a strip size of the RAID. In other words, a data block size is equal to the strip size of the RAID. A strip size, sometimes also referred to as a block size, a chunk size, or a granularity, indicates a size of a data block written into each disk. Generally, a strip size of a RAID is between 2 KB to 512 KB (or greater), and a value of the strip size is 2 to the power of n, for example, 2 KB, 4 KB, 8 KB, 16 KB, or the like.

It can be understood that in an actual application, a data block may be obtained from a file according to a starting address of the file and a strip size, or the received T files may be divided into data blocks according to the strip size of the RAID in advance. When a file is divided, if a size of a file is less than the strip size, the file may be obtained to be a data block. If after a file is divided, a size of remaining data of the file is less than the strip size, the remaining data of the file is obtained to be a data block. For example, as shown in FIG. 4-B, the controller 115 divides received 4 to-be-stored files F1-F4 according to the strip size of the RAID. The file F1 is divided into 5 data blocks: F1-1, F1-2, F1-3, F1-4, and F1-5. The file F2 is divided into 3 data blocks: F2-1, F2-2, and F2-3. The file F3 is divided into one data block F3-1. The file F4 is divided into 5 data blocks: F4-1, F4-2, F4-3, F4-4, and F4-5. In step 310, the storage device 110 may directly obtain a data block, to be written into a disk, of each file as a data block in a corresponding position of the stripe. For example, when data blocks in the stripe 1 shown in FIG. 4A are determined, F1-1 may be obtained to be the data block 1 in the stripe 1, F2-1 may be obtained to be the data block 2 in the stripe 1, and F3-1 may be obtained to be the data block 3 in the stripe 1.

It should be noted that when a data block of a file is obtained, any data block, to be written into disks, of the file may be obtained as a data block in a position corresponding to the file in the stripe. For example, if all data blocks in F1 are to be written into disks, any one of the data blocks F1-1, F1-2, F1-3, F1-4, or F1-5 may be obtained to be the data block 1 of the stripe 1.

In step 315, the storage device 110 obtains the check block in the stripe according to the data blocks in the stripe. After obtaining the data blocks in the stripe, the storage device 110 may perform a check computation on the data blocks in the stripe according to a check algorithm of the RAID, to obtain the check block in the stripe. The obtained check block is a check block in the stripe in a position corresponding to the sequence number determined in step 305. It can be understood that the check algorithm of the RAID includes but is not limited to a parity check algorithm.

In step 320, the storage device 110 writes, into the T storage apparatuses, the data blocks in the stripe and the obtained check block in the stripe. Specifically, the storage device 110 may concurrently write, into T disks that form the RAID, the data blocks and the check block in the stripe. For example, if F1-1, F2-1, F3-1, and the check block 1 form the stripe 1 in FIG. 4A, F1-1, F2-1, F3-1, and the check block 1 may be concurrently written into 4 disks that form the RAID, where the check block 1 is obtained by computing according to F1-1, F2-1, and F3-1. A storage structure of the stripe 1 shown in FIG. 4-C is formed.

It can be understood that, after the stripe 1 is written, the storage device 110 may continue to obtain data blocks in the stripe 2, and obtain the check block in the stripe 2 according to the obtained data blocks, and concurrently write the data blocks and the check block in the stripe 2 into disks. A storage structure of the stripe 2 shown in FIG. 4-C is formed. Other stripes are processed by analog until all files are stored in disks.

It can be understood that, in the embodiment of the present invention, after a data block of a file is written into a disk, the data block may be marked as a data block that has been written into a disk, or may be deleted from the file, so that a data block, to be written into a disk, of the file can be identified when a data block in a next stripe needs to be obtained. In the embodiment of the present invention, a method of identifying a data block, to be written into a disk, of a file is not limited.

It can be known from the foregoing that in the file processing method described in the embodiments of the present invention, the storage device 110 determines a sequence number of a check block in a stripe of the RAID. A data block, to be written into a storage apparatus, of the $K^{th}$ file in received T files is obtained to be the $K^{th}$ data block in the stripe, where a value of K is not equal to the sequence number of the check block in the stripe. After obtaining data blocks from the files, the storage device 110 obtains, by computing, the check block in the stripe according to the obtained data blocks in the stripe, and write the data blocks and the check block in the stripe into disks that form the RAID. In this method, before the storage device 110 write the files into disks, data blocks of one file are correspond to same position in stripes, thus the data blocks of the one file are correspond to one disk in the RAID. Therefore, the storage device 110 can write all data blocks of the one file into one disk. In an application scenario of archiving, when a file, which is stored in the RAID by using the file processing method described in the embodiment of the present invention, needs to be accessed, not all disks in the RAID need to be woken up or powered on, but only one disk in which the file is stored needs to be operated, so as to achieve a significant effect of energy saving.

In addition, in the file processing method described in the embodiment of the present invention, data blocks of different files form a stripe, and the storage device 110 writes the stripe into disks. When a certain data block of a stripe is damaged, the storage device 110 can restore the damaged data block according to a check block and data blocks of other files in the stripe. Security of file storage is ensured while a file write efficiency is ensured.

Figure 4B:
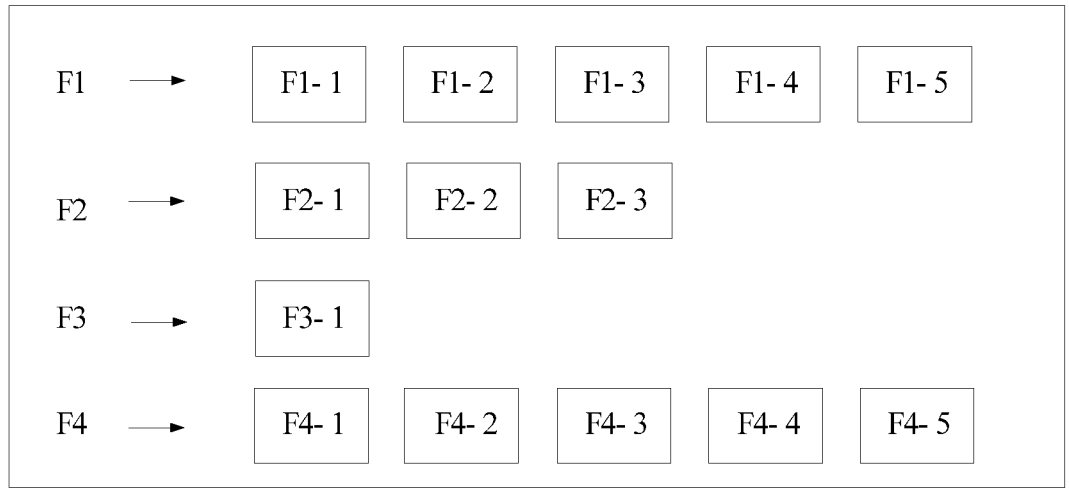
FIG. 4B is a schematic diagram of dividing data blocks in a file according to an embodiment of the present invention.
Figure 4C:
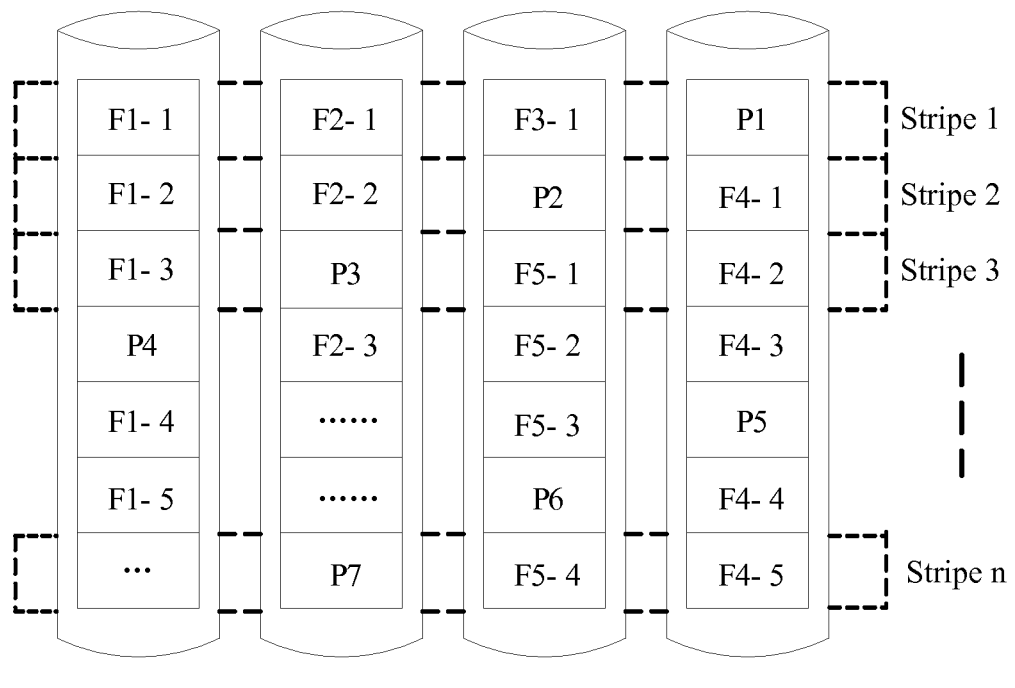
FIG. 4C is a schematic diagram of a file storage structure according to an embodiment of the present invention.
Figure 5:
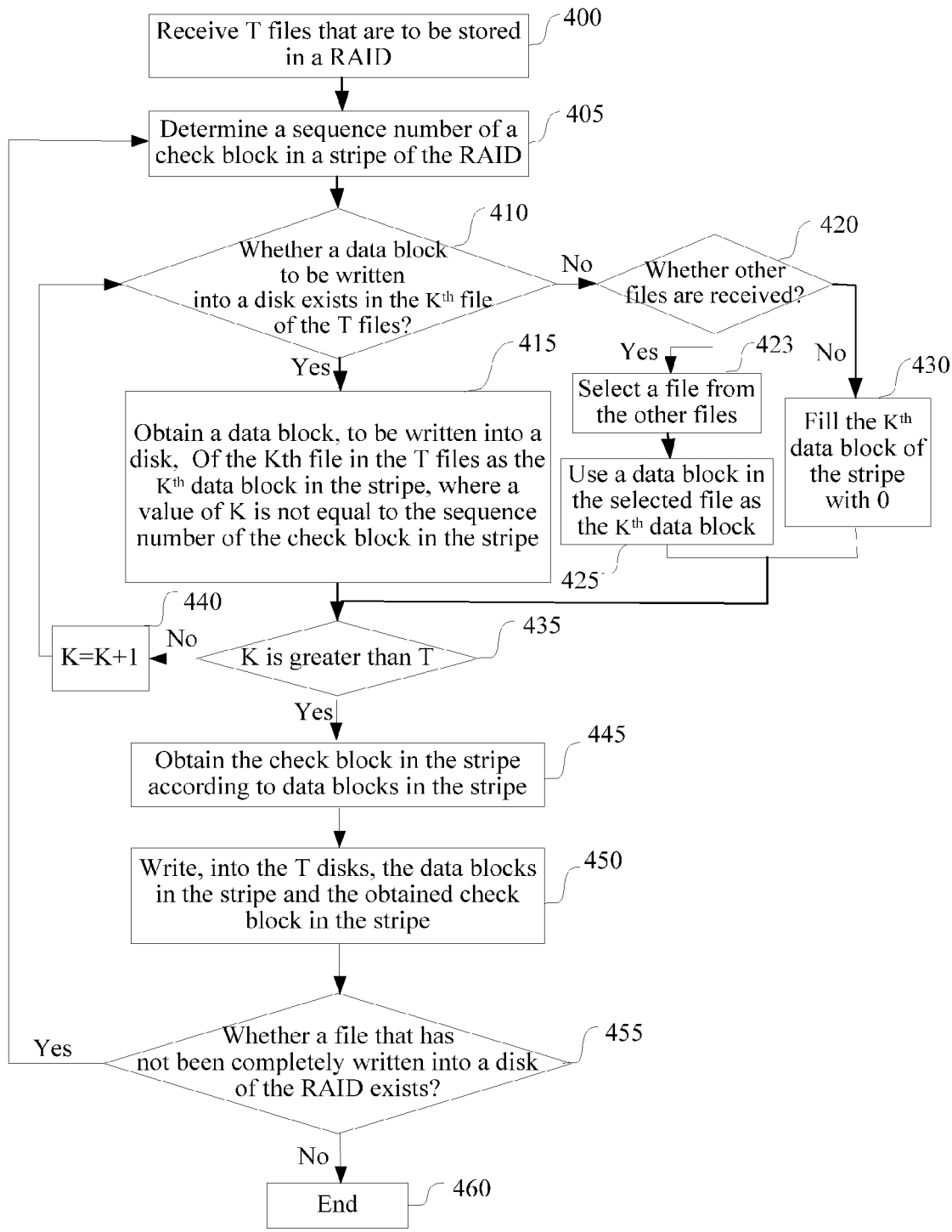
FIG. 5 is a flowchart of another file processing method according to an embodiment of the present invention.

FIG. 5 is a flowchart of another file processing method according to an embodiment of the present invention. The method may be performed by the controller 115 of the storage device 110 shown in FIG. 2, and the method may be applied to a file archiving scenario. In the embodiment of the present invention, a RAID including 4 disks is used as an example for description. The following describes FIG. 5 with reference to FIG. 2, FIG. 4B, and FIG. 4C. As shown in FIG. 5, the method includes:

In step 400, the storage device 110 receives T files that are to be stored in a RAID.

In step 405, the storage device 110 determines a sequence number of a check block in a stripe of the RAID.

Step 400 is similar to step 300 in FIG. 3, and step 405 is similar to step 305 in FIG. 3. Therefore, reference may be made to related description of step 300 and step 305, and details are not repeatedly described herein.

In step 410, the storage device 110 determines whether the $K^{th}$ file of the T files includes a data block to be written into a disk. If the $K^{th}$ file includes a data block to be written into a disk, step 415 is performed; otherwise, step 420 is performed. In a case, if in step 405, the storage device 110 determines that the sequence number of the check block in a stripe of the RAID is not 1, an initial value of K may be first set to 1 in this step. In other words, the storage device 110 needs to determine whether the $1^{st}$ file of the T files includes a data block to be written into a disk. If the $1^{st}$ file includes a data block to be written into a disk, step 415 is performed; otherwise, step 420 is performed. In another case, if in step 405, the storage device 110 determines that the sequence number of the check block in a stripe of the RAID is 1, an initial value of K may be first set to 2 in this step. In other words, the storage device 110 needs to determine whether the $2^{nd}$ file includes a data block to be written into a disk. If the $2^{nd}$ file includes a data block to be written into a disk, step 415 is performed; otherwise, step 420 is performed. In another expression manner, if the sequence number of the check block in one stripe is not 1, the storage device needs to start to obtain a data block in the one stripe from the $1^{st}$ file. If the sequence number of the check block in one stripe is 1, the storage device needs to start to obtain a data block in the one stripe from the $2^{nd}$ file.

It can be understood that in the embodiment of the present invention, the storage device 110 may identify a data block that is of a file and has been written into a disk by marking the data block or by deleting the data block from the file, so that the storage device 110 can identify a data block, to be written into a disk, of the file. A method for identifying a data block, to be written into a disk, of a file by the storage device 110 is not limited herein.

In step 415, the storage device 110 obtains a data block, to be written into a disk, of the $K^{th}$ file in the T files, as the $K^{th}$ data block in the stripe, where a value of K is not equal to the sequence number of the check block in the stripe. In other words, when the storage device 110 obtains data blocks of files, the storage device 110 cannot obtain a data block of a file, where a sequence of the file corresponds to the sequence number of the check block in the stripe, so that a position corresponding to the sequence number can be reserved for the check data in the stripe. For specific description of step 415, reference may be made to related description of step 310 in FIG. 3.

In step 420, the storage device 110 determines whether other files except the T files are received. In an actual application, if the storage device 110 determines, in step 410, that the $K^{th}$ file of the T files does not include a data block to be written into a disk, it indicates that the $K^{th}$ file has been completely stored in the disk. The storage device 110 needs to further determine whether the other files except the T files are received, where the other files need to be stored in the disks that form the RAID. If the storage device 110 receives the other files except the T files, step 423 of the method is performed; otherwise, step 430 of the method is performed.

For example, as shown in FIG. 4-B and FIG. 4-C, the $3^{rd}$ file F3, in the 4 files shown in FIG. 4-B, is relatively small, and F3 is obtained as a data block F3-1. After the stripe 1, which is formed by data blocks F1-1, F2-1, F3-1, and the check block P1, is written into 4 disks that form the RAID, when the storage device 110 obtains data blocks of the stripe 3, because the sequence number of the check block P3 in the stripe 3 is 2, for the stripe 3, a data block, to be written into a disk, of the third file F3 needs to be obtained as the $3^{rd}$ data block. Because the data block F3-1 of the file F3 has been written into the stripe 1, the file F3 does not include a data block to be written into a disk. Therefore, the storage device 110 needs to determine whether other files except the files F1-F4 are received. For example, in the example shown in FIG. 4-B, the storage device 110 needs to determine whether the $5^{th}$ file F5 is received.

In step 423, the storage device 110 selects a file from the other files except the T files. Specifically, the storage device 110 may randomly select a file from the other files.

In step 425, the storage device 110 obtains a data block, to be written into a disk, of the selected file as the $K^{th}$ data block in the stripe. In an actual application, in a case, when the $K^{th}$ file of the T files has been written into a disk, if the storage device 110 receives the other files, except the T files, that need to be stored in the disks that form the RAID, the storage device 110 may obtain a data block, to be written into a disk, of any one file of the other files as the $K^{th}$ data block in the stripe. In this manner, the storage device 110 may write a stripe, which includes the data block that is of any one file of the received other files and data blocks, to be written into a disk, of other files in the T files, into the disk. For example, in the foregoing example, if the storage device 110 receives the $5^{th}$ file F5 that is to be stored in the RAID, the storage device 110 may obtain the data block F5-1, to be written into a disk, of the file F5 as a data block in a position with a sequence number of 3 in the stripe 3. Then step 435 is performed to form the stripe 3 including the data block F5-1 and data blocks in the files F1 and F4. For details, reference may be made to a structure of the stripe 3 shown in FIG. 4-C.

In step 430, the storage device 110 fills the $K^{th}$ data block in the stripe with 0s. In an actual application, in another case, if the storage device 110 determines, in step 420, that the other files, except the T files, that need to be stored in the RAID are not received, the storage device 110 may, in step 430, fill the $K^{th}$ data block in the stripe with 0s, which is used to indicate that the data block is not used.

In step 435, the storage device 110 determines whether the value of K is greater than T. If the value of K is not greater than T, step 440 is performed; otherwise, step 445 is performed.

In step 440, the storage device 110 sets K=K+1. In other words, the storage device 110 sets the value of the variable K to a value of K+1, and returns to step 410 to start to obtain a next data block in the stripe. By performing step 410, step 415, step 435, and step 440, the storage device 110 may obtain data blocks of other files except a file, where a sequence of the file corresponds to the sequence number of the check block in the stripe, so as to obtain all data blocks in the stripe.

In step 445, the storage device 110 obtains the check block in the stripe according to the data blocks in the stripe. For specific description of this step, reference may be made to related description of step 315 in FIG. 3.

In step 450, the storage device 110 writes, into the T disks, the data blocks in the stripe and the obtained check block in the stripe. For specific description of this step, reference may be made to related description of step 320 in FIG. 3.

In step 455, the storage device 110 determines whether a file that has not been completely written into a disk of the RAID exists. If a file in the T files has not been completely written into a disk, in other words, if the file is not yet stored in the disk completely, go back to step 405. The storage device 110 continues to determine a sequence number of the check block in the next stripe, and obtain data blocks in the next stripe, so as to write the data blocks and the check block in the next stripe into the disks. If in step 455, the storage device 110 determines that all files that are to be stored in the RAID have been stored completely, step 460 of the method is performed to end the storage procedure. By using the file processing method shown in FIG. 5, after files are stored in the RAID, one file may be stored in one disk of the RAID. A specific storage structure may be shown in FIG. 4-C. It can be clearly understood by a person skilled in the art that, for the purpose of convenient and brief description, for description of some steps of the embodiment in FIG. 5, reference may be made to specific description of a corresponding process in the embodiment shown in FIG. 3.

Figure 6A:
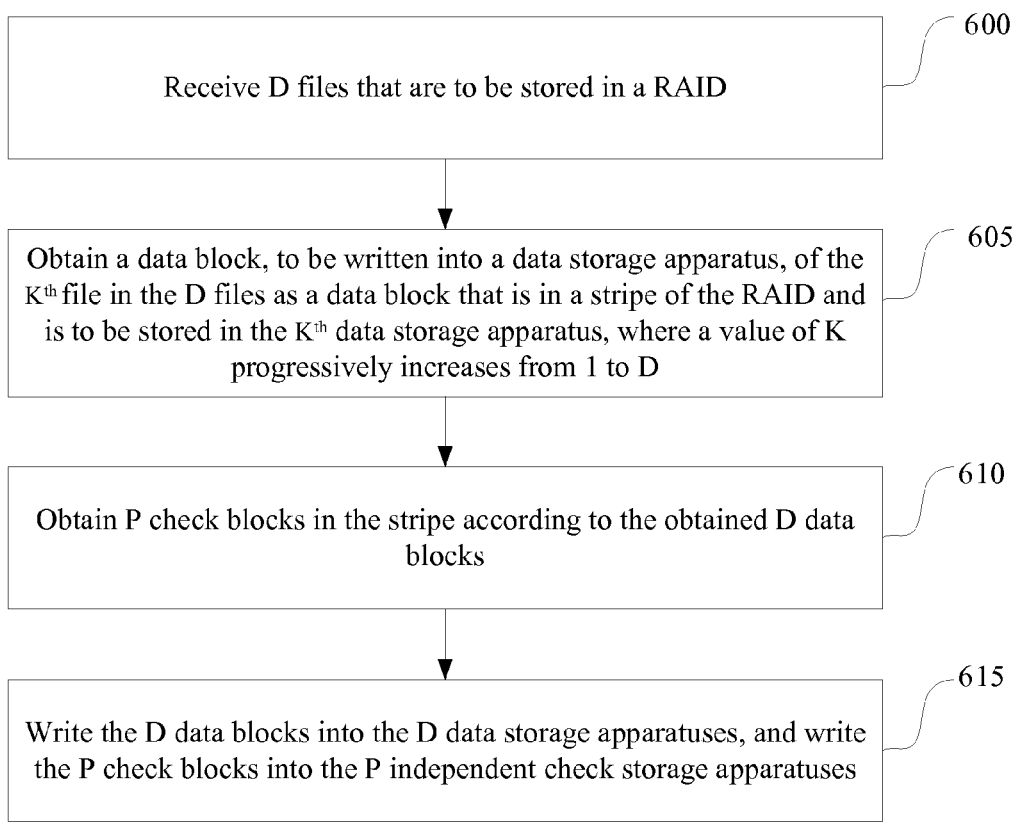
FIG. 6A is a flowchart of still another file processing method according to an embodiment of the present invention.
Figure 6B:
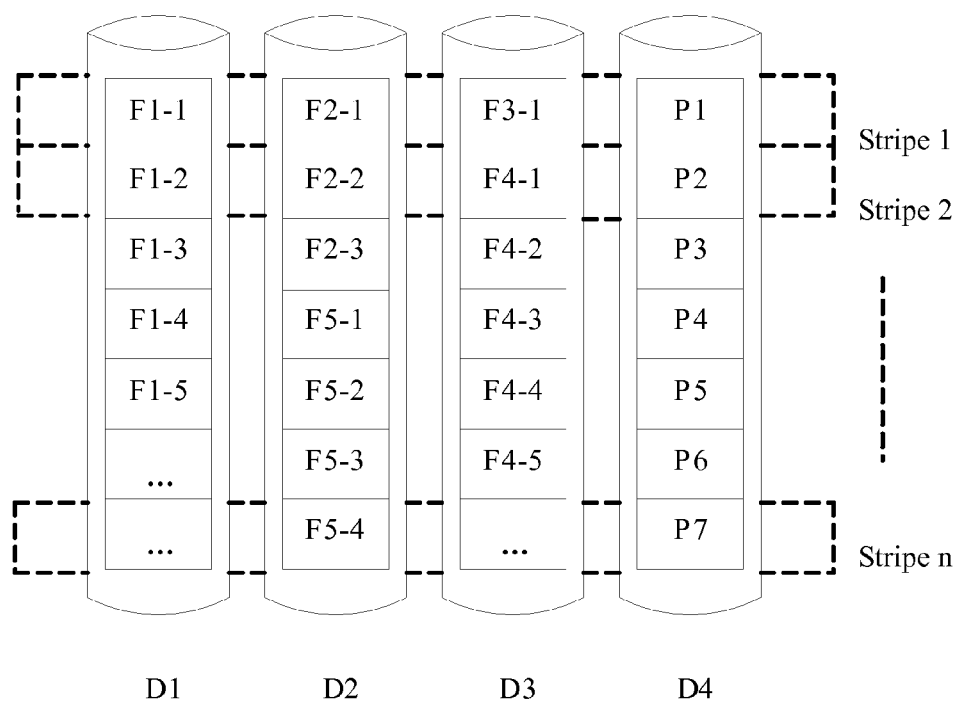
FIG. 6B is a schematic diagram of another file storage structure according to an embodiment of the present invention.

In another case, when an organization form of the RAID is a RAID with an independent check disk, for example, when the RAID is a RAID 3 or a RAID 4, the controller 115 may perform file storage according to a method shown in FIG. 6. In the embodiment of the present invention, a RAID including 4 member disks is used as an example for description. The organization form of the RAID is the RAID 3, where the RAID includes 3 data disks and 1 independent check disk. A person skilled in the art can know that a data disk is a member disk, used for storing a data block, in an array. An independent check disk is a member disk, specially used for storing a check block, in the array. The following describes FIG. 6 with reference to FIG. 2, FIG. 4B, and FIG. 6B. As shown in FIG. 6A, the method includes:

In step 600, the storage device 110 receives D files that are to be stored in a RAID. A value of D is equal to the number of data disks in the RAID. For example, in the RAID including 4 member disks as described above, if the organization form of the RAID is the RAID 3, the number of data disks in the RAID is 3, and the number of independent check disks is 1.

It can be understood that the storage device 110 may process the D files when receive D files. The storage device 110 may also buffer received multiple files in the cache 120, and then randomly select D files from the received multiple files for processing when storage time reaches. For example, as shown in FIG. 4-B, the storage device 110 may select 3 files F1-F3 from 4 files F1, F2, F3, and F4, which are received and are to be stored in the RAID, for processing.

In step 605, the storage device 110 obtains a data block, to be written into a data storage apparatus, of the $K^{th}$ file in the D files as a data block that is in a stripe of the RAID and is to be stored in the $K^{th}$ data storage apparatus, where a value of K progressively increases from 1 to D.

Because the organization form of the RAID in the embodiment of the present invention is a RAID with an independent check disk, in this step, when obtaining data blocks in the stripe, the storage device 110 needs to reserve a position for a check block to be written into the independent check disk. The storage device 110 may use a data block, to be written into a data disk, of the $K^{th}$ file as the data block that is in the stripe and is to be stored in the $K^{th}$ data disk. For example, in the RAID shown in FIG. 6B, member disks D1, D2, and D3 are data disks, and a member disk D4 is an independent check disk. When obtaining data blocks of the stripe, the storage device 110 first sets an initial value of K to 1, and then after obtaining one data block, makes the value of K progressively increase by 1 successively, where the value of K is not greater than D. In this manner, the storage device 110 starts to obtain a data block from the 1st file, and then successively obtain data blocks of the $2^{nd}$ and the $3^{rd}$ files. As shown in FIG. 4-B, the storage device 110 may successively use the data block F1-1 in the $1^{st}$ file F1 as the data block, which is to be written into the $1^{st}$ data disk D1, in the stripe 1; use the data block F2-1 in the $2^{nd}$ file F2 as the data block, which is to be written into the $2^{nd}$ data disk D2, in the stripe 1; and use the data block F3-1 in the $3^{rd}$ file F3 as the data block, which is to be written into the $3^{rd}$ data disk D3, in the stripe 1. It should be noted that a position of the independent check disk in the RAID is not limited in the embodiment of the present invention, for example, the member disk D3 may be used as the independent check disk, and the member disk D4 may be used as the $3^{rd}$ data disk in the RAID.

In step 610, the storage device 110 obtains P check blocks in the stripe according to the obtained D data blocks. For example, after the three data blocks F1-1, F2-1, and F3-1 in the stripe 1 in FIG. 6B are obtained, a check computation may be performed on the three data blocks in the stripe 1 according to a check algorithm of the RAID, to obtain the check block P1 of the stripe 1. It should be noted that in the RAID with an independent check disk, the number of check blocks in the stripe is related to a specific organization form of the RAID. For example, the RAID 3 has one independent check disk, and then one stripe has one check block. The RAID 4 has two independent check disks, and then one stripe has two check blocks. In the embodiment of the present invention, neither is the organization form of the RAID specifically limited, nor is the number of check blocks in the stripe limited. In addition, the check algorithm in the embodiment of the present invention includes but is not limited to a parity check algorithm.

In step 615, the storage device 110 writes the D data blocks into the D data storage apparatuses, and writes the P check blocks into the P independent check storage apparatuses. For example, the storage device 110 may concurrently write the 3 data blocks and 1 check block in the stripe 1 into the member disks of the RAID. A person skilled in the art may know that when data blocks and a check block in a stripe are written into member disks, in the RAID with an independent check disk, data blocks need to be written into data disks, and the check block in the stripe needs to be written into the independent check disk. After data is written into disks, a storage structure of the stripe 1 shown in FIG. 6B may be formed.

In the embodiment shown in FIG. 6, the storage device 110 uses a data block, to be written into a data disk, of the $K^{th}$ file in the D files as a data block that is in a stripe of the RAID and is to be stored in the $K^{th}$ data disk. In this manner, data blocks of one file correspond to one data disk in the RAID, so that all data blocks belonging to the one file are written into the one data disk. In an application scenario of archiving, when a file in the RAID needs to be accessed, not all disks in the RAID need to be woken up, but only one disk in which the file is stored needs to be woken up, so as to achieve an effect of energy saving.

In addition, in the file processing method described in FIG. 6, the storage device 110 writes a stripe, which includes data blocks of different files into disks. When a data block in a stripe is damaged, the storage device 110 can restore the damaged data block by using a check block and data blocks of other files in the stripe, thereby ensuring security of file storage while ensuring a file write efficiency.

Figure 7:
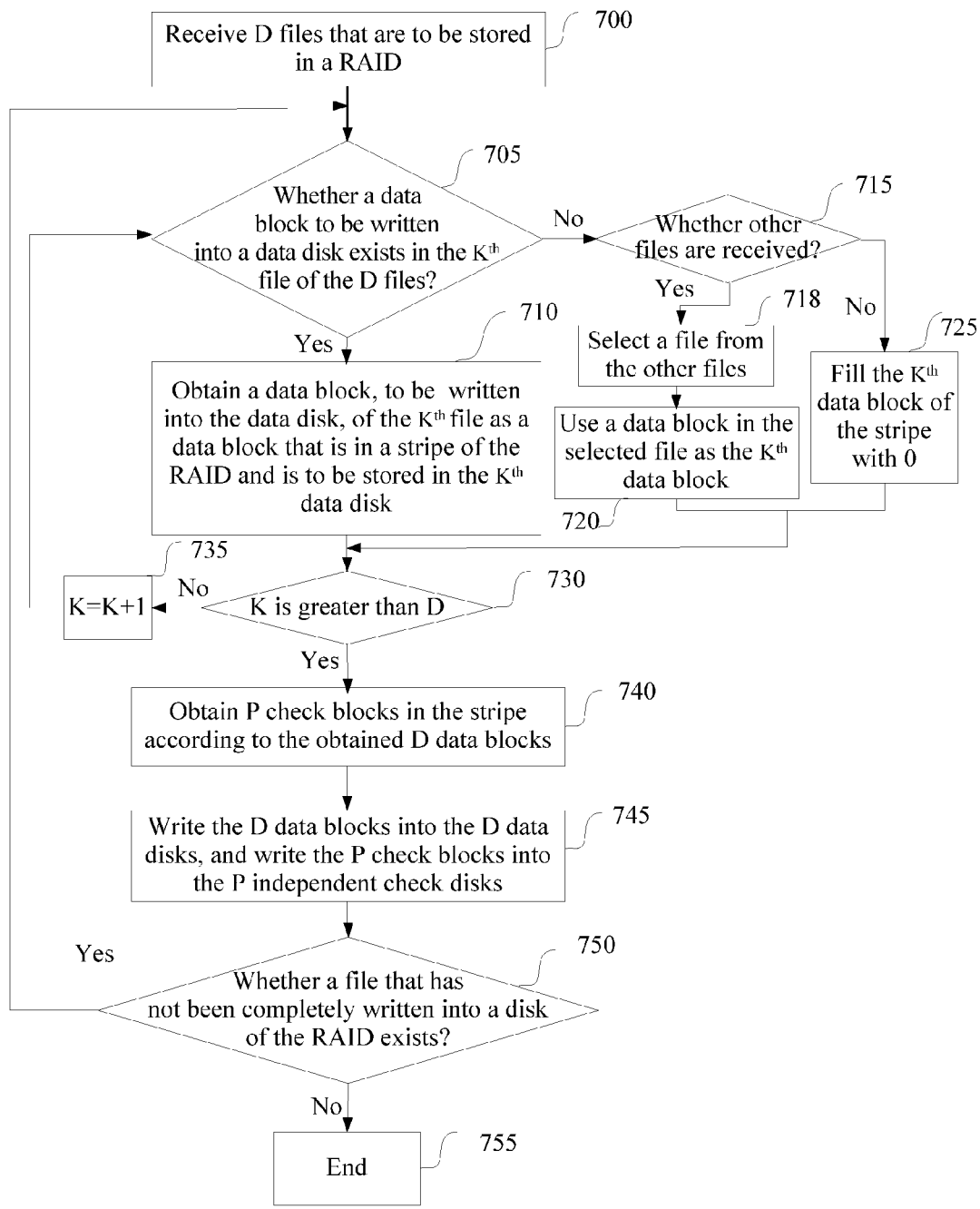
FIG. 7 is a flowchart of yet another file processing method according to an embodiment of the present invention.

FIG. 7 is a flowchart of another file processing method according to an embodiment of the present invention. The method may be performed by the controller 115 of the storage device 110 shown in FIG. 2, and the method may be applied to a RAID with an independent check disk. In the embodiment of the present invention, a RAID 3 including 4 disks is used as an example for description. The following describes FIG. 7 with reference to FIG. 2, FIG. 4-B, and FIG. 6B. As shown in FIG. 7, the method includes:

In step 700, the storage device 110 receives D files that are to be stored in a RAID. For details about this step, reference may be made to related description of step 600.

In step 705, the storage device 110 determines whether the $K^{th}$ file of the D files includes a data block to be written into a data disk of the RAID. If the $K^{th}$ file includes a data block to be written into the data disk of the RAID, step 710 of this method is performed; otherwise, step 715 of this method is performed. An initial value of K is 1. In another expression manner, the storage device 110 needs to determine whether the $1^{st}$ file of the D files includes a data block to be written into the data disk of the RAID. For a specific method for determining whether the $K^{th}$ file includes a data block to be written into the RAID, reference may be made to related description of step 410 in FIG. 5.

In step 710, the storage device 110 obtains a data block, to be written into the data disk, of the $K^{th}$ file as a data block that is in a stripe of the RAID and is to be stored in the $K^{th}$ data disk. For specific description of step 710, reference may be made to related description of step 605 in FIG. 6.

In step 715, the storage device 110 determines whether other files except the D files are received. If the other files except the D files are received, step 718 of the method is performed; otherwise, step 725 of the method is performed. In an actual application, if the storage device 110 determines, in step 705, that the $K^{th}$ file of the D files does not include a data block to be written into a disk, it indicates that the $K^{th}$ file has been all stored in the disk. In this case, the storage device 110 needs to further determine whether the other files, which need to be written into the data disks that form the RAID, are received. If the storage device 110 receives the other files except the D files, step 718 of the method is performed; otherwise, step 725 of the method is performed.

For example, among the 3 files F1, F2, and F3 shown in FIG. 4B, the $3^{rd}$ file F3 is relatively small, and F3 is used as the data block F3-1. In addition, the data block F3-1 has been written into the RAID shown in FIG. 6B. The storage device 110 currently needs to obtain a data block in the stripe 2, and then the storage device 110 may determine that the $3^{rd}$ file F3 does not include a data block to be written into the RAID. In this case, the storage device 110 needs to determine whether other files except F1-F3 are received, for example, the $4^{th}$ file F4. If the other files are received, step 718 of this method is performed; otherwise, step 725 is performed.

In step 718, the storage device 110 selects a file from the received other files except the D files. Specifically, the storage device 110 may randomly select a file from the received other files.

In step 720, the storage device 110 uses a data block, to be written into a disk, of the selected file as the $K^{th}$ data block in the stripe. For example, in the foregoing example, if the storage device 110 receives the $4^{th}$ file F4 that is to be stored in the RAID, the storage device 110 may use the data block F4-1, to be written into a disk, of the file F4 as the $3^{rd}$ data block in the stripe 2. In another expression manner, after the storage device 110 stores, in the RAID, all data blocks of the $K^{th}$ file of the D files, the storage device 110 starts to store data blocks of the other files except the D files.

In step 725, the storage device 110 fills the $K^{th}$ data block in the stripe with 0s. In another case, when the storage device 110 determines, in step 715, that the other files except the D files are not received, where the other files need to be stored in the RAID, the storage device 110 may, in step 725, fill the $K^{th}$ data block in the stripe with 0s, which is used to indicate that the data block is not used.

In step 730, the storage device 110 determines whether the value of K is greater than D. If the value of K is not greater than D, step 735 of the method is performed; otherwise, step 740 of the method is performed. Because the initial value of K is 1 in the embodiment of the present invention, after one data block in the stripe is obtained, it may be determined whether the value of K is greater than D. If the value of K is not greater than D, step 735 of the method is performed. If the value of K is greater than D, it indicates that D data blocks in the stripe have been obtained, and step 740 of the method is performed.

In step 735, the storage device 110 sets K=K+1, and goes back to step 705, so as to obtain a next data block in the stripe. In other words, the storage device 110 sets the value of the variable K to a value of K+1, and goes back to step 705 to start to obtain the next data block in the stripe circularly by using steps of the foregoing method, until all data blocks in the stripe are obtained completely.

In step 740, the storage device 110 obtains P check blocks in the stripe according to the obtained D data blocks. For specific description of this step, reference may be made to related description of step 610 in FIG. 6.

In step 745, the storage device 110 writes the D data blocks into the D data disks, and writes the P check blocks into the P independent check disks. For specific description of this step, reference may be made to related description of step 615 in FIG. 6.

In step 750, the storage device 110 determines whether a file that has not been completely written into a disk of the RAID exists. If a file in the D files has not been completely written into a disk of the RAID, in other words, if the file has not been stored completely in the RAID, go back to step 705 of the method. The storage device 110 continues to determine a sequence number of a check block in the next stripe, and obtain data blocks in the next stripe, so as to write data blocks and the check block in the next stripe into the disks that form the RAID. If in step 750, the storage device 110 determines that all files that are to be stored in the RAID have been stored in the RAID completely, step 755 of the method is performed to end this storage procedure.

FIG. 6 and FIG. 7 introduce a method for storing multiple files in a RAID with an independent check disk. By using the file processing method shown in FIG. 6 or FIG. 7, after a file is stored in the RAID, one file may be stored in one disk of the RAID. A specific storage structure may be shown in FIG. 6B.

It can be clearly understood by a person skilled in the art that, for the purpose of convenient and brief description, for description of some steps of the embodiment in FIG. 7, reference may be made to specific description of a corresponding process in the embodiment shown in FIG. 6. In addition, the file processing methods described in FIG. 6 and FIG. 7 are based on same invention conception with the file processing methods described in FIG. 3 and FIG. 5. In the foregoing embodiments, the description of each of the embodiments has respective focuses. For a part that is not described in detail in a certain embodiment, reference may be made to related descriptions in other embodiments. By using the file processing method described in the foregoing embodiments, data blocks of one file can be stored in one disk of the RAID. In addition, the storage device 110 writes a stripe, which includes data blocks of different files, into a disk. When a data block of a stripe is damaged, the storage device 110 can restore the damaged data block according to a check block in the stripe and data blocks of other files in the stripe, thereby ensuring security of file storage.

Figure 8:
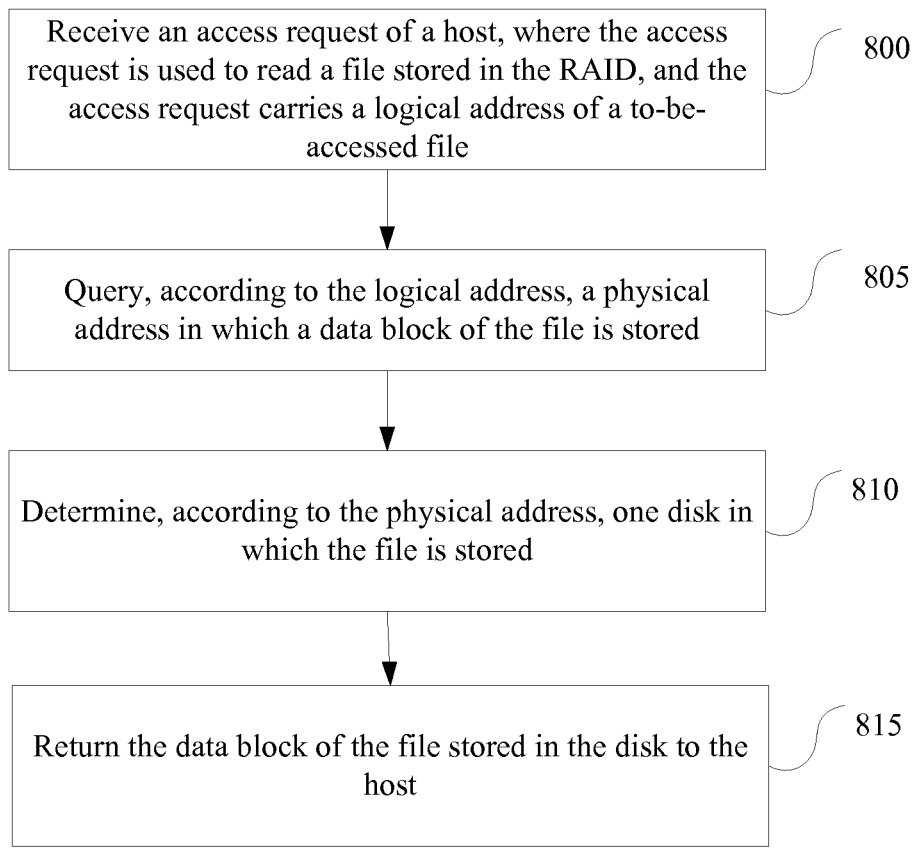
FIG. 8 is a schematic flowchart of a file reading method according to an embodiment of the present invention.

In the embodiment of the present invention, by using the forgoing file processing method shown in FIG. 3, FIG. 5, FIG. 6, or FIG. 7, after a file is stored in the RAID, in an archiving scenario, the stored file is less frequently accessed. Therefore, in order to achieve a purpose of energy-saving, a disk is generally in a sleeping or power-off state. When the file needs to be read, the method described in FIG. 8 may be used for reading. The following describes FIG. 8 with reference to FIG. 1 and FIG. 2. The method includes:

In step 800, the storage device 110 receives an access request of the host 100, where the access request is used to read a file stored in the RAID, and the access request carries a logical address of the file that needs to be accessed. It can be understood that the access request may also carry a file name of the to-be-accessed file.

In step 805, the storage device 110 queries, according to the logical address, a physical address in which a data block of the file is stored. Generally, after data is stored by the storage device 110, a mapping table of a mapping relationship between the physical address and the logical address for storing data is constructed. After receiving the access request for reading a file, the storage device 110 may search, in the mapping table, the physical address of the data in the disk according to the logical address carried in the access request. It can be understood that in the RAID, a mapping table may be constructed both for data in the cache 120 and for data in the disk 130. When a physical address is searched, generally, the mapping table of the cache 120 may be first searched and then the mapping table of the disk 130 is searched. If data is in the cache, the data in the cache is directly returned to the host.

In step 810, the storage device 110 determines, according to the physical address, one disk for storing the file. In the embodiment of the present invention, after files are stored, by using the file processing method in the foregoing embodiments, in disks that form a RAID, one file can be stored in one disk. Therefore, in this step, the storage device 110 can determine, according to a physical address, one disk for storing the file.

In step 815, the storage device 110 returns data blocks of the file stored in the disk to the host 100. By using the foregoing file processing method in the embodiment of the present invention, one file can be stored in one disk. Therefore, when a stored file is read, the storage device 110 may, according to the physical address, wake up a disk 130 in which the file is stored, or power on the disk 130, and return, to the host 100, data blocks that is of the file and stored in the disk 130. Specifically, the storage device 110 may read data in the disk 130 according to the obtained physical address, and return the data to the host 100.

In the embodiment of the present invention, because files are stored according to the method shown in FIG. 3, FIG. 5, FIG. 6, or FIG. 7, data belonging to one file is stored in one disk. Therefore, when a file is read, only one disk in which the file is stored needs to be waken up or powered on, and data of the file is read from the disk and returned to the host, with no need to wake up or power on all disks of the RAID, resulting in a significant effect of energy saving.

The embodiment of the present invention further provides a computer program product for data processing, including a computer readable storage medium stored with program code, where an instruction included in the program code is used to execute the method process described in any one of the foregoing method embodiments. A person of ordinary skill in the art may understand that the foregoing storage medium may include any non-transitory machine-readable medium capable of storing program code, such as a USB flash drive, a removable hard disk, a magnetic disk, an optical disc, a random-access memory (RAM), a solid state disk (SSD), or a non-volatile memory.

A person skilled in the art may understand that, in the embodiment of the present invention, a disk for storing metadata and the cache 120 always remain in a power-on state, so as to make a timely response to an access request of the host. A person skilled in the art may know that the metadata is data that describes data stored in a RAID and an environment of the data, for example, the metadata may include a mapping relationship between a logical address and a physical address.

Because frequent power-on or power-off of a disk may affect the effect of energy saving of a storage system, and may also affect a life time of the disk. To avoid a disk from being frequently powered on or powered off, disks may be graded in an actual application. A small quantity of high-performance disks keep in a power-on state all the time, while a large quantity of high-capacity disks enter an energy saving state. A high-performance disk herein refers to a disk with a relatively low access delay or a disk with many input/output operations per second (IOPS), for example a solid state disk (SSD). A high-capacity disk refers to a disk with a relatively large capacity. After storage, according to a file access condition, a file with high access frequency may be moved to the small quantity of reserved high-performance disks that keep in a power-on state all the time, so as to reduce the number of times that a disk is powered on or waken up, and improve a response speed.

Further, to avoid that a disk is frequently powered on or powered off, the storage system in the embodiment of the present invention may also provide a warning mechanism and a protection mechanism. Statistics are collected on the number of accumulated times that each disk in the RAID is powered on and powered off. When the number of times that a certain disk is powered on and powered off within a preset period of time exceeds a preset threshold, the system provides a prompt or a warning, and may take some protection measures. A set threshold, for example, may be 10 times/day or 100 times/month. A protection measure may be set as performing no power-on or power-off operation on the disk in a set period of time, and so on, which is not limited herein.

Finally, it should be noted that the foregoing embodiments are merely intended for describing the technical solutions of the present invention, rather than limiting the present invention.

What is claimed is:

1. A file processing method performed by a storage device for storing a file in a redundant array of independent disks (RAID), comprising:
   receiving T files that are to be stored in the RAID, wherein a value of the T is no less than 3, and the value of the T is equal to the number of disks that form the RAID;
   determining a sequence number of a check block in a stripe of the RAID;
   repeatedly obtaining a data block, to be written into a disk, of the $K^{th}$ file in the T files as the $K^{th}$ data block in the stripe, wherein a value of K progressively increases from 1 to T, and the value of K is not equal to the sequence number of the check block in the stripe;
   computing the check block in the stripe according to data blocks in the stripe; and
   writing, into the T disks, the data blocks in the stripe and the obtained check block in the stripe, wherein each block is written into one disk.

2. The file processing method according to claim 1, further comprising:
   when the $K^{th}$ file has no data block to be written into the RAID, determining whether other files except the T files are received;
   if the other files are received, selecting a file from the received other files; and
   using a data block, to be written into a disk, in the selected file as the $K^{th}$ data block in the stripe.

3. The file processing method according to claim 1, further comprising:
   when the $K^{th}$ file has no data block to be written into a disk, if other files except the T files are not received, filling the $K^{th}$ data block in the stripe with 0s.

4. A method performed by a storage device for storing a file in a redundant array of independent disks RAID, wherein the RAID comprises D data disks and P independent check disks, a value of the D is no less than 2, and a value of the P is no less than 1; and the method comprises:
   receiving D files that are to be stored in the RAID;
   repeatedly obtaining a data block, to be written into a data disk, of the $K^{th}$ file in the D files as a data block that is in a stripe of the RAID and is to be stored in the $K^{th}$ data disk, wherein a value of K progressively increases from 1 to D;
   computing P check blocks in the stripe according to the obtained D data blocks; and
   writing the D data blocks into the D data disks, and writing the P check blocks into the P independent check disks, wherein each block is written into one disk.

5. The method according to claim 4, further comprising:
   when the $K^{th}$ file has no data block to be written into a data disk, determining whether other files except the D files are received;
   if the other files are received, selecting a file from the received other files; and
   using a data block, to be written into a disk, in the selected file as a data block that is in the stripe and is to be stored in the $K^{th}$ data disk.

6. The method according to claim 4, further comprising:
   when the $K^{th}$ file has no data block to be written into a data disk, if other files except the D files are not received, filling the data block that is in the stripe and is to be stored in the $K^{th}$ data disk with 0s.

7. A storage device, comprising:
   a redundant array of independent disks RAID, configured to store a file, and the RAID comprises T disks, wherein a value of the T is no less than 3; a communication interface, configured to communicate with a host and the RAID; and
   a processor, configured to receive T files that are to be stored in the RAID;
   determine a sequence number of a check block in a stripe of the RAID;
   repeatedly obtain a data block, to be written into a disk, of the $K^{th}$ file in the T files as the $K^{th}$ data block in the stripe, wherein a value of K progressively increases from 1 to T, and the value of K is not equal to the sequence number of the check block in the stripe;
   compute the check block in the stripe according to data blocks in the stripe; and
   write, into the T disks, the data blocks in the stripe and the obtained check block in the stripe, wherein each block is written into one disk.

8. The storage device according to claim 7, wherein the processor is further configured to:
   when the $K^{th}$ file has no data block to be written into a disk, determine whether other files except the T files are received;
   if the other files are received, select a file from the received other files; and
   use a data block, to be written into a disk, in the selected file as the $K^{th}$ data block in the stripe.

9. The storage device according to claim 7, wherein the processor is further configured to:
   when the $K^{th}$ file has no data block to be written into a disk, if other files except the T files are not received, fill the $K^{th}$ data block in the stripe with 0s.

10. A storage device, comprising:
    a redundant array of independent disks RAID, configured to store a file, wherein the RAID comprises D data disks and P independent check disks, a value of the D is no less than 2, and a value of the P is no less than 1; a communication interface, configured to communicate with a host and the RAID; and
    a processor, configured to receive D files that are to be stored in the RAID;
    repeatedly obtain a data block, to be written into a data disk, of the $K^{th}$ file in the D files as a data block that is in a stripe of the RAID and is to be stored in the $K^{th}$ data disk, wherein a value of K progressively increases from 1 to D;
    compute P check blocks in the stripe according to the obtained D data blocks; and
    write the D data blocks into the D data disks, and write the P check blocks into the P independent check disks, wherein each block is written into one disk.

11. The storage device according to claim 10, wherein the processor is further configured to:
    when the $K^{th}$ file has no data block to be written into a data disk, determine whether other files except the D files are received;
    if the other files are received, select a file from the received other files; and
    use a data block, to be written into a disk, in the selected file as a data block that is in the stripe and is to be stored in the $K^{th}$ data disk.

12. The storage device according to claim 10, wherein processor is further configured to:

when the $K^{th}$ file has no data block to be written into a data disk, if other files except the D files are not received, fill the data block that is in the stripe and is to be stored in the $K^{th}$ data disk with 0s.

* * * * *